United States Patent
DuBois et al.

(10) Patent No.: US 11,204,749 B2
(45) Date of Patent: Dec. 21, 2021

(54) STATE MACHINES FOR INSTALLATION MANAGEMENT

(71) Applicant: Apple Inc., Cupertino, CA (US)

(72) Inventors: Dana J. DuBois, Cupertino, CA (US);
Matthew Sibson, Cupertino, CA (US);
Sam H. Gharabally, Cupertino, CA (US);
Gregory L. Murray, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1056 days.

(21) Appl. No.: 15/270,654

(22) Filed: Sep. 20, 2016

(65) Prior Publication Data

US 2018/0081659 A1 Mar. 22, 2018

(51) Int. Cl.
*G06F 9/445* (2018.01)
*G06F 8/61* (2018.01)
*G06F 9/48* (2006.01)

(52) U.S. Cl.
CPC .............. *G06F 8/61* (2013.01); *G06F 9/485* (2013.01)

(58) Field of Classification Search
CPC .................................. G06F 8/61; G06F 9/485
See application file for complete search history.

(56) References Cited

U.S. PATENT DOCUMENTS

| | | | | |
|---|---|---|---|---|
| 5,963,743 A | * | 10/1999 | Amberg | G06F 8/61 707/999.104 |
| 2006/0010345 A1 | * | 1/2006 | Schnoebelen | G06F 11/0745 714/25 |
| 2009/0064135 A1 | * | 3/2009 | Jimmerson | G06F 8/61 717/178 |
| 2009/0271781 A1 | * | 10/2009 | Cui | G06F 8/61 717/173 |
| 2010/0131084 A1 | * | 5/2010 | Van Camp | G06F 8/65 700/86 |
| 2013/0159891 A1 | * | 6/2013 | Farrell | G06F 8/38 715/762 |
| 2013/0263012 A1 | * | 10/2013 | Stallings | G06F 17/30058 715/748 |
| 2015/0067670 A1 | * | 3/2015 | Benson | G06F 8/61 717/171 |

* cited by examiner

*Primary Examiner* — Wei Y Zhen
*Assistant Examiner* — Amir Soltanzadeh
(74) *Attorney, Agent, or Firm* — Invoke

(57) ABSTRACT

A job state machine may transition to a downloading state in response to a start message on the job pipeline, wherein the job object causes job data to be downloaded to the device when the job state machine is in the downloading state. The job state machine may transition to an installing state in response to an assertion message on the job pipeline, wherein the job object causes downloaded job data to be installed on the device when the job state machine is in the installing state. The job state machine may transition to a finished state when the job data is installed on the device. The job state machine may be recoverable to the waiting state, the downloading state, or the installing state in response to a job object failure while the job state machine is in the waiting state, downloading state, or installing state, respectively.

52 Claims, 12 Drawing Sheets

STATE MACHINES FOR INSTALLATION MANAGEMENT

TECHNICAL FIELD

The disclosure generally relates to installing, updating, and restoring applications.

BACKGROUND

Users of personal computing devices such as smart phones, tablets, personal computers, and the like may be able to add, update, remove, and restore applications (or "apps") to change device functionality. Many devices include systems for performing these processes, such as app stores. An app store may provide a user interface (UI) for finding new apps to install, updating or removing apps that are currently installed, and/or restoring apps that have been previously removed. Additionally, some apps may be updated automatically. When an app is added, updated, or restored, the device may download app data and perform an installation process.

SUMMARY

Computing devices may manage app initial installation, update, restoration, and/or other jobs using state machines. A state machine may be a program element that may be in one of a finite number of states. The state machine may be in only one current state at a time and may transition from one state to another when prompted by a triggering event. For example, when a user wishes to install an app, or an app attempts an automatic update or installation, a job state machine may be created. The job state machine may create additional state machines (e.g., download state machines and/or install state machines). As the installation process proceeds through several steps (request, download, install, cleanup, etc.), the state machines may transition from one state to another. In the event that the installation process is interrupted or paused, the process may be restarted and may resume by restoring the state machines to their last known states.

Particular implementations provide at least the following advantages. Because an installation process may be resumed by restoring state machines to their last known states, a cancelled or erroneous installation may be resumed without starting from the beginning of the process. For example, data that has already been downloaded may not need to be redownloaded, improving device efficiency and speed. If a previous device state associated with a state machine job needs to be restored, the state machines may be restored to a known stable state. In addition to overall job state machines, sub-process state machines may be established and may transition as a job proceeds to reduce occurrence of steps being performed out of order, as the states may not transition until actions associated with the states are completed. Transitioning state machines as a job proceeds may also provide reliable and discrete job status tracking.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

A device may use state machines to manage app installation and related processes to control and recover these processes. For example, a device may be downloading an app, and the device may crash during the download. The state machine or machines responsible for app installation may have been in a downloading state. When the device recovers, the state machines may be restored to the downloading state to resume the download. The entire installation process need not be restarted from the beginning. In another example, if the download was complete and the state machines were in an install state when the device crashed, the state machines may be restored to the install state rather than restarting the installation process and redownloading the same data that has already been obtained. By using state machines, the device may also ensure that every step of an installation process is performed in the correct sequence. This may avoid problems arising from steps occurring out of place (e.g., two app icons on a desktop or home screen because an icon was added by an install process before a download process was complete, but then the install process was triggered to add an app when the download completed). Furthermore, a process using state machines may be reverted to earlier states simply by retrieving and transitioning to the older states.

In addition to new app installations, a device may use state machines to manage related processes such as app upgrades and/or previously-installed app restorations. These may be similar process in that, for example, an upgrade may involve downloading and installing data like an installation, but without registering the app with the system, adding icons, etc. In another example, restorations may involve downloading and installing basic app data but also retrieving or downloading previously established user-specific data (e.g., settings, user data, etc.) and incorporating it into the restored app.

Each overall process (e.g., the overall installation or upgrade process) may be a single job. Each job may have a job state machine. When a job begins, job data may define the job and allow the device to create the state machine. Within each job, one or more sub-processes (e.g., downloading, installing, etc.) may have separate state machines (e.g, download state machine, install state machine, etc.).

The job may create these state machines as needed depending on the nature of the process being completed.

Figure 1:
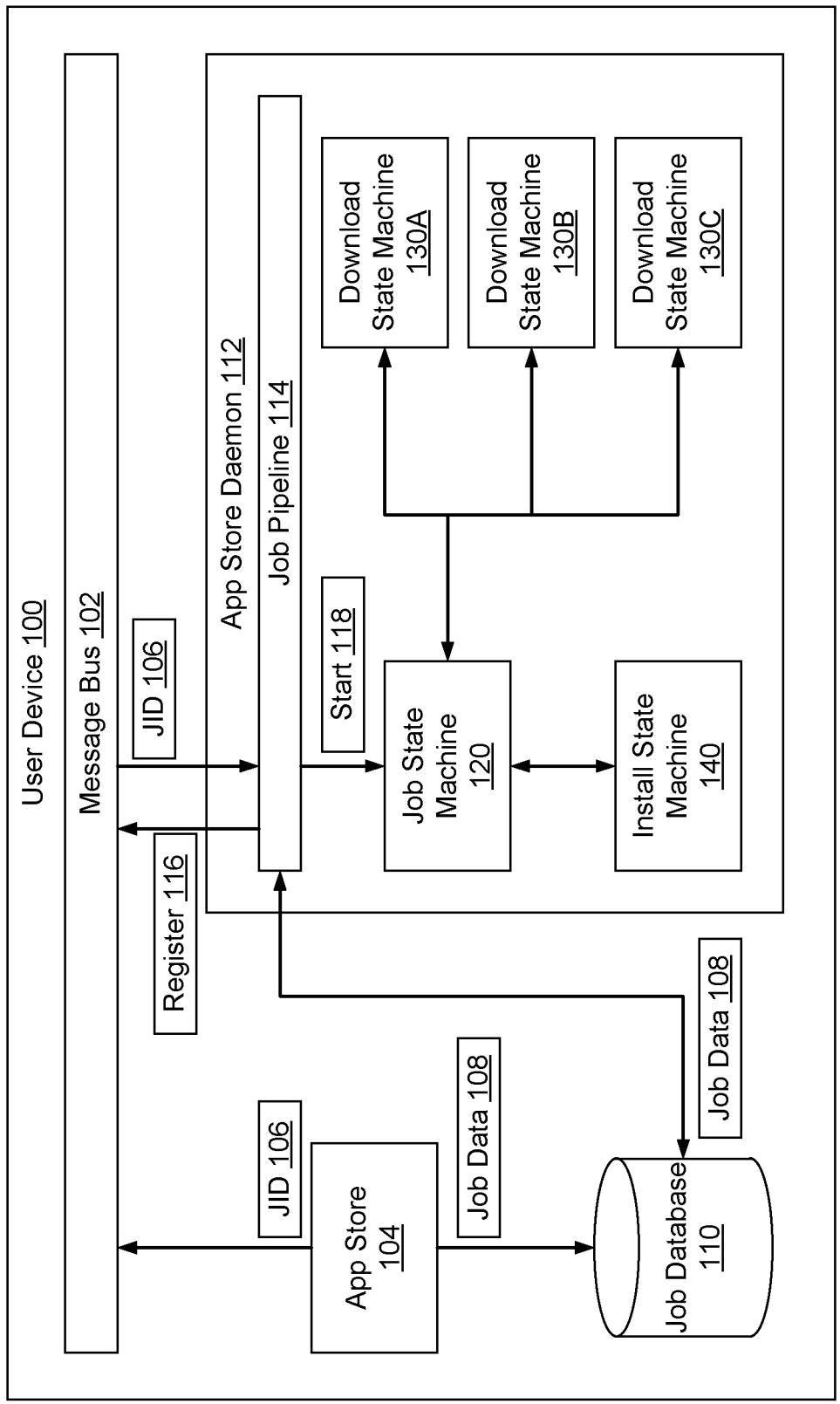
FIG. 1 is a block diagram of an example device configured to use state machines for application installation.

FIG. 1 is a block diagram of an example device 100 configured to use state machines for application installation. Device 100 may be one of a variety of electronic devices including, but not limited to, laptop computers, desktop computers, computer terminals, television systems, tablet computers, e-book readers, smart phones, smart watches, and wearable computers, for example. Device 100 may include a message bus 102. Processes and/or objects may push event data to message bus 102, and other processes and/or objects may see the data on message bus 102 and react to the events. For example, a process may place event data indicating that it has begun or completed on message bus 102, and an object may react to the event data by changing state machine state and possibly by also placing data on message bus 102 indicating that it has changed state.

Device 100 may include an app store 104 configured to provide a graphical user interface (GUI) for managing app installations. App store 104 may also be configured to generate requests for app data from remote servers, manage automatic app updates, manage app installations, etc. For example, when an app installation process is initiated (e.g., a user purchase of a new app or app upgrade, a purchase of an app on another device from the same user account causing automatic download to device 100, a user restoration of an old app, or a user requested or automatic app update), app store 104 may put data describing the app (JID 106) on message bus 102. JID 106 may be an ID number for the app and/or may include additional metadata.

App store 104 may also place job data 108 in a job database 110 on device 100. Job data 108 may define the job that may be performed in device 100 to get and install the app. Job data 108 may include a job identifier, a state of one or more state machines associated with the job, data describing where app data can be obtained, and/or data linking the job to one or more other state machines (e.g., data linking a job state machine with a download state machine and an install state machine). Each job may correspond to a single task, for example a first job may be for a complete install process for a first app, a second job may be for a complete install process for a second app, and a third job may be for a complete update process for the first app. Job data 108 in database may be updated as state machines transition as described below, and may be used for crash recovery and as a point of synchronization, for example.

Device 100 may include an app store daemon 112 or job manager. Daemon 112 may manage state machines that carry out app store processes (e.g., job management, download, and/or installation). Daemon 112 may include a job pipeline 114, which may detect and/or post events that may trigger state machine transitions. Daemon 112 may register 116 with message bus 102 so that messages such as read JID 106 may be sent from message bus 102 to job pipeline 114.

In response to reading JID 106, daemon 112 may access job database 110 to get job data 108 related to JID 106. Job data 108 may instantiate a job object and define an initial state of a job state machine 120 for the app installation process job. Job state machine 120 may be encapsulated in the job object. A job pipeline 114 may be established for the job by daemon 112, and job processing may begin. Job events may appear on job pipeline 114. Job processing may read JID 106 from job pipeline 114, triggering a job start event 118 causing job state machine 120 to transition to a new state. As described in more detail below, job processing associated with job state machine 120 may generate events that instantiate download objects with job state machine(s) 130A, 130B, and/or 130C and an install object with install state machine 140. By registering 116 with message bus 102, daemon 112 may pick up events by type (e.g., job, download, install) and transition state machines accordingly.

Example State Machines

Figure 2:
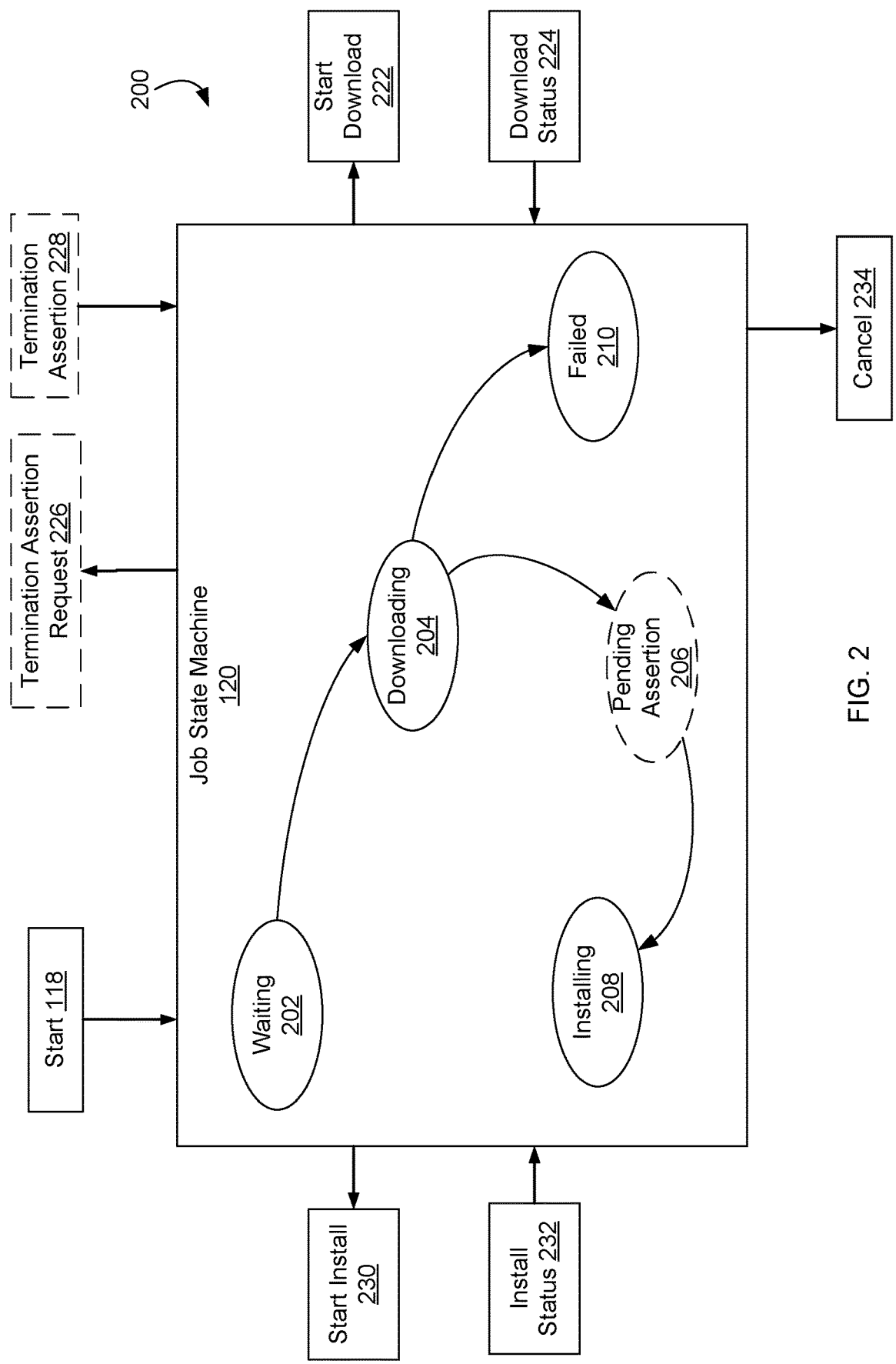
FIG. 2 is an example job state machine diagram.

FIG. 2 is an example job state machine 120 diagram, with job state machine 120 encapsulated in job object 200. Job state machine 120 may manage the overall operation of the job being performed (e.g., new app install, app update, app restore, etc.). Job state machine 120 may transition between several states, including a waiting state 202, a downloading state 204, a pending assertion state 206 (or preparing install state), an installing state 208, and/or a failed state 210. Transitions between states may be responsive to several events, including a start event 118, a download status event 224, a termination assertion event 228, and/or an install status event 232. Job state machine 120 may generate events used by other state machines as well, including a start download event 222, a termination assertion request event 226, a start install event 230, and/or a cancel event 234.

The types of processing available to app store daemon 112 for completing the job may vary depending on the state of job state machine 120. For example, when job state machine 120 is in downloading state 204, received commands related to processing after failure (e.g., commands expected in failed state 210) may be ignored. Likewise, when job state machine 120 is in installing state 208, received commands related to downloading (e.g., commands expected in downloading state 204) may be ignored. Only state-appropriate commands may be processed.

The following example, wherein an app is purchased by a device 100 user and initially downloaded and installed, illustrates how job state machine 120 may progress through several states. Job state machine 120 may transition between states similarly for other jobs, in some cases with variations depending on events that occur.

When app store 104 first places a representation of the state of the job state machine 120 into database 110, job state machine 120 may have an initial state of waiting 202. App store daemon 112 may read the representation from database 110 and initialize job pipeline 114.

A start event 118 may occur and appear on job pipeline 114, which may cause the job state machine 120 to transition to downloading state 204. App store daemon 112 may change job state machine 120 state in database 110 from waiting 202 to downloading 204. While job state machine 120 is in downloading state 204, job processing may include determining data to be downloaded and sources for the data. This may generate one or more start download events 222 which may be placed on job pipeline 114 and may instantiate download objects managed by download state machines 130. Additional data placed on job pipeline 114 may trigger transitions for the download state machines 130 as described below.

Download state machines 130 may track downloads, and the downloads may generate events as they complete successfully or encounter problems (e.g., terminate unexpectedly, time out, deliver corrupt data, canceled by user, etc.). When a download ends, successfully or unsuccessfully, a download status event 224 may be generated and may trigger a transition for job state machine 120. When the download status event 224 indicates an unsuccessful download, job state machine 120 may transition to a failed state 210, and app store daemon 112 may update job state machine 120 status in database 110 to failed 210. When the download status event 224 indicates a successful download, job state machine 120 may transition to an installing state 208, and app store daemon 112 may update job state machine 120 status in database 110 to installing 208.

In some cases, download status events 224 may indicate that a download status has been updated without specifying the nature of the status change. Receiving a download status event 224 may cause job to spawn an action that determines why the download failed (e.g., did the download fail due to network or file problems or was it canceled by a user). Each job may have one download for the main application associated with the job, and some jobs may have additional downloads for external resources owned by that application. For some types of downloads, such as ODR (on demand resource) and/or optional app features, failure of the download may not be critical because the app may still be obtained and installed. There may be no need to transition to failed state 210 in this case. On the other hand, a download failure for a main binary for an app may prevent installation and trigger a transition to failed state 210.

When job state machine 120 is in failed state 210, app store daemon 112 may send cancel events out to currently downloading download state machines 130. Cancel events may cause those download state machines 130 to transition to their own failed states and perform data cleanup actions. In some cases, job state machine 120 may automatically transition from failed state 210 to waiting state 202 after a period of time to automatically restart the job. In other cases, app store daemon 112 may request user permission to restart the job while job state machine 120 in failed state 210. If the user restarts the job, this may create an event used to transition job state machine 120 from failed state 210 to waiting state 202. In some cases, failed state 210 may be a hard failure that ends the job altogether.

When job state machine 120 enters installing state 208, job processing may generate a start install event 230 which may be placed on job pipeline 114 and may instantiate an install state object managed by an install state machine 140. Additional data placed on job pipeline 114 may trigger transitions for the install state machine 140 as described below. When the installation is complete, and the user is able to run the app, an install status event 232 may be picked up by job state machine 120, indicating that the processing tracked by job state machine 120 may be complete. App store daemon 112 may clear the job state machine 120 and/or other state machines from memory.

In some embodiments, job state machine 120 may be responsive to additional events and/or may transition to additional states. For example, the job may be an update to an app already installed on device 100. It may be desirable to prevent the app from running while the update is being installed and to prevent the update from being installed while the app is running.

Accordingly, after downloading is complete, job state machine 120 may transition to pending assertion state 206 before transitioning to installing state 208. When job state machine 120 is in pending assertion state 206, app store daemon 112 may send a termination assertion request 226, requesting notification when the app is terminated and instructing device 100 operating system to render the app unlaunchable until the job is complete. If the user is actively using the app, the operating system may wait until the user stops using the app to terminate the app and render the app unlaunchable. When the app is not running and is not launchable, the operating system may generate a termination assertion event 228 which may be placed on job pipeline 114. Upon receiving termination assertion event 228, job state machine 120 may transition to installing state 208.

Figure 3:
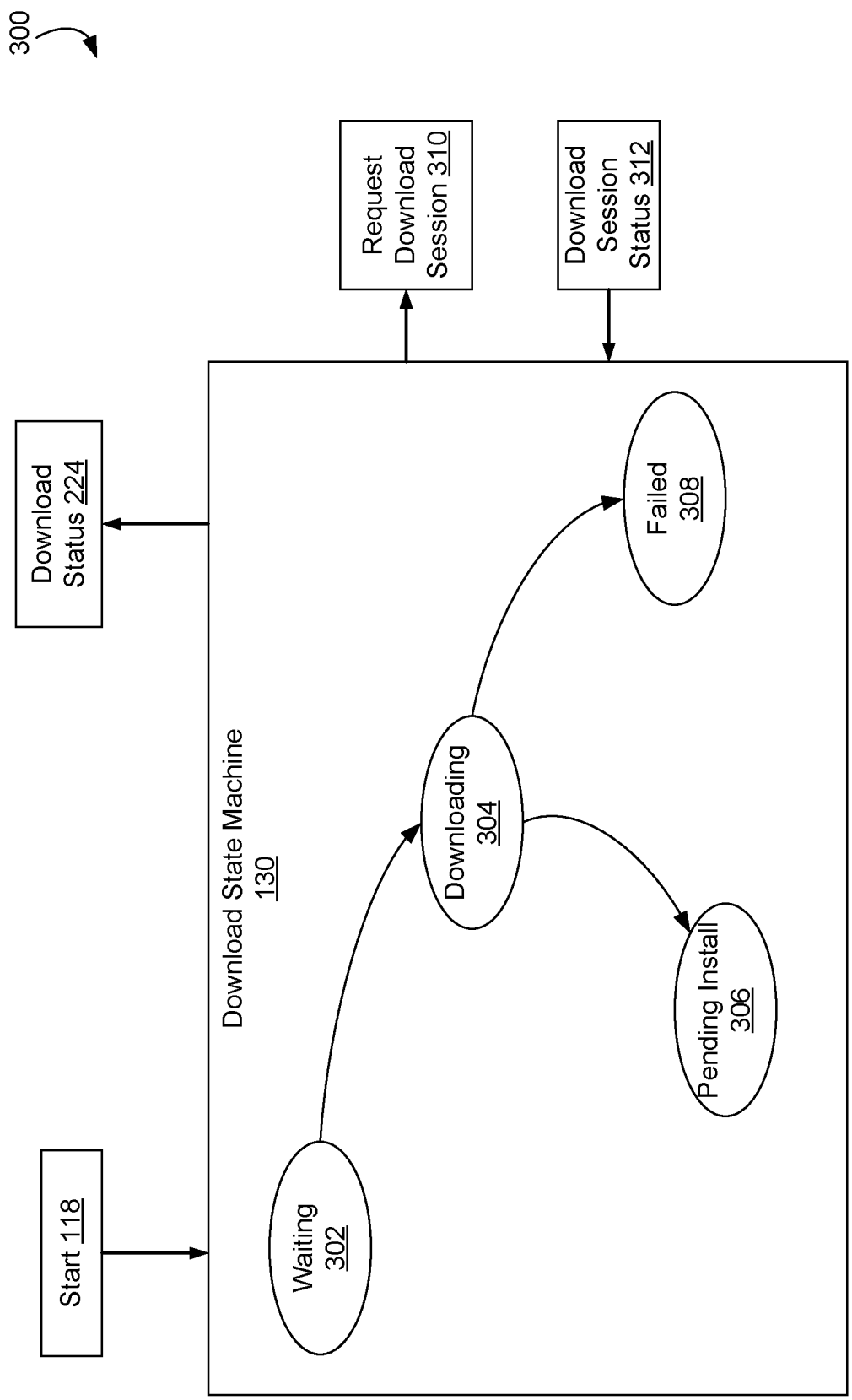
FIG. 3 is an example download state machine diagram.

FIG. 3 is an example download state machine 130 diagram, with download state machine 130 encapsulated in download object 300. Download state machine 130 may manage the download of at least a portion of app data. FIG. 3 shows a single download state machine 130, but multiple download state machines 130 may be employed for some jobs. For example, a job may create a separate download state machine 130 for each resource that is downloaded to complete the job.

Download state machine 130 may be created in a waiting state 302. As described above, the job process may create a start download event 222 when job state machine 120 transitions to downloading state 204. Start download event 222 may cause download state machine 130 to transition from waiting state 302 to downloading state 304, in which download object may request a download session 310 and start downloading job data. In some cases, device 100 may cap simultaneous downloads (e.g., 3 at a time), but there may be more download state machines 130 than allowable simultaneous downloads. Thus, some download state machines 130 may transition to download state 304, and others may wait in waiting state 302 for a download session to open up. When a download finishes and sends a download status event 224, the job may generate another start download event 222 to transition another download state machine 130 and start another download.

The download process may use job data 108 in database 110 to build a request for the data to be downloaded 310 (e.g., an NSURL request). Once the connection is established and the data is downloading, download session status information 312 may be generated (e.g., indicating download is progressing or download has stopped). Download session status information 312 indicating the download has stopped may cause download state machine 130 to transition to failed state 308. Download session status information 312 indicating the download has completed may cause download state machine 130 to transition to pending install state 306.

Download state machine 130 may generate download status event 224 when it has entered pending install state 306 or failed state 308. Job state machine 120 may receive download status event 224 and, when all download state machines 130 for the job have delivered download status events 224 indicating completed download or failure of non-critical download, may transition to installing state 208 as described above. If download status event 224 indicates failure, job state machine 120 may transition to failed state 210 if the download was critical to the job, as described above. Download state machine 130 may remain in pending install state 306 until it is cleaned up due to job completion or failure.

In some embodiments, if the job restarts after download state machine 130 has reached pending install state 306 (e.g., failure was due to another download state machine 130, but this download state machine 130 completed its download), download state machine 130 may be restarted in pending install state 306 so it does not redownload the data. Download state machine 130 in pending install state 306 may ignore start download events 222, for example.

Figure 4:
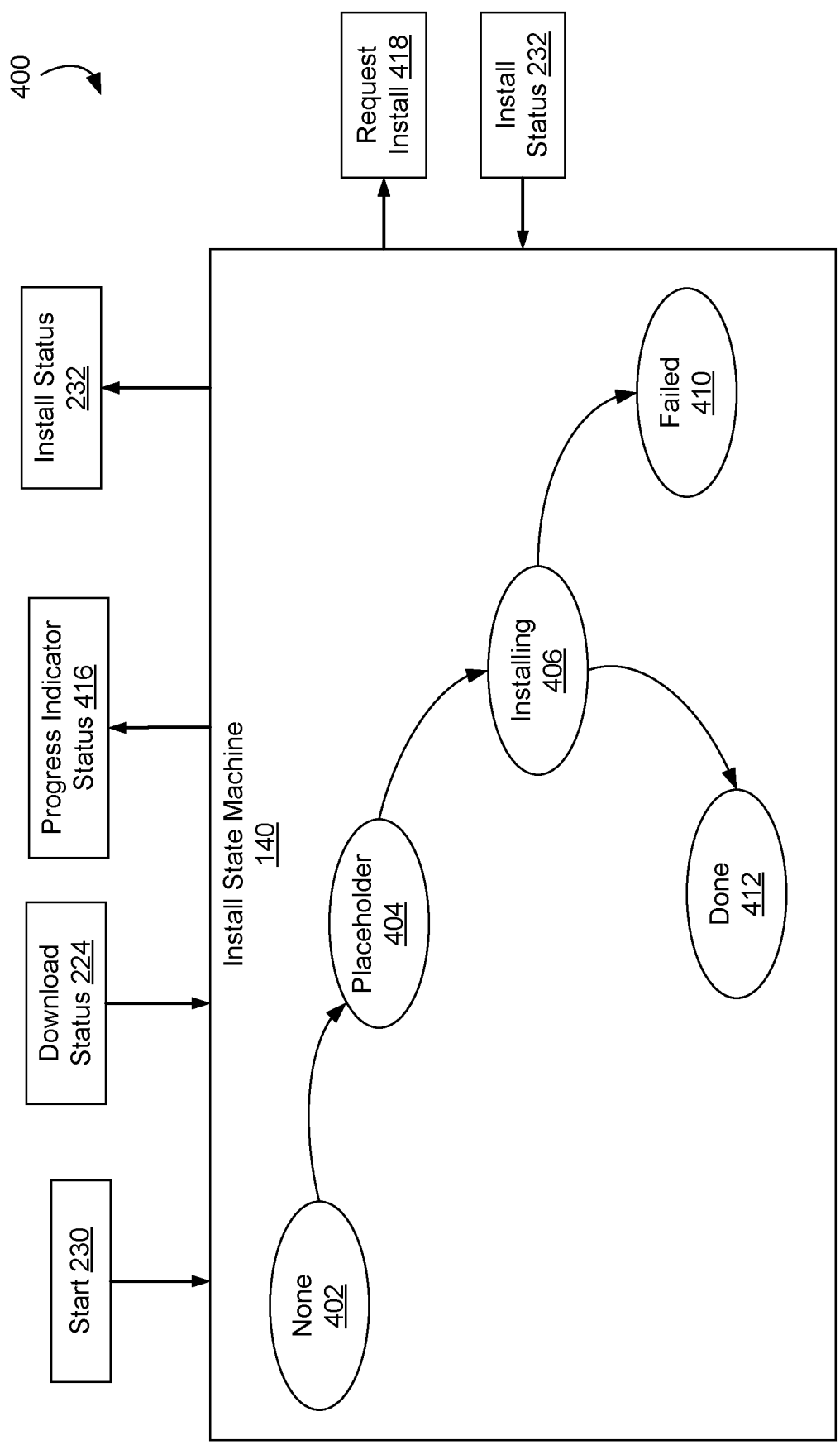
FIG. 4 is an example install state machine diagram.

FIG. 4 is an example install state machine 140 diagram, with install state machine 140 encapsulated in install object 400. Install state machine 140 may manage the UI aspects of the job (e.g., what the user sees on device 100 screen and/or how other components of device 100 display information about the app being installed, such as icons).

Install state machine 140 may be created in a none state 402. Start download events 222, generated as described above, may cause install state machine 140 to transition to a placeholder state 404. When install state machine 140 is in placeholder state 404, app store daemon 112 may direct device 100 operating system to create a placeholder icon for the app.

Download status event 224 indicating successful completion of one or more downloads may cause install state machine 140 to transition to installing state 406. The install process may generate a request to initiate the installation 418. Device 100 may install the app and update the install process with install status 232, while the install process Progress indicator status data 416 may advance as the install proceeds (e.g., including a percent complete or other progress indicator).

If install status 232 indicates that the install has failed, this may serve as an event to transition install state machine 140 to a failed state 410. If install status 232 indicates that the install has succeeded, this may serve as an event to transition install state machine 140 to a done state 412. Install status 232 may be sent to job state machine 120 as well. Done state 412 may prevent the accidental addition of a placeholder for an app that is installed, because install state machine 140 may not respond to start events 230 in done state 412.

Example Processes

Figure 5:
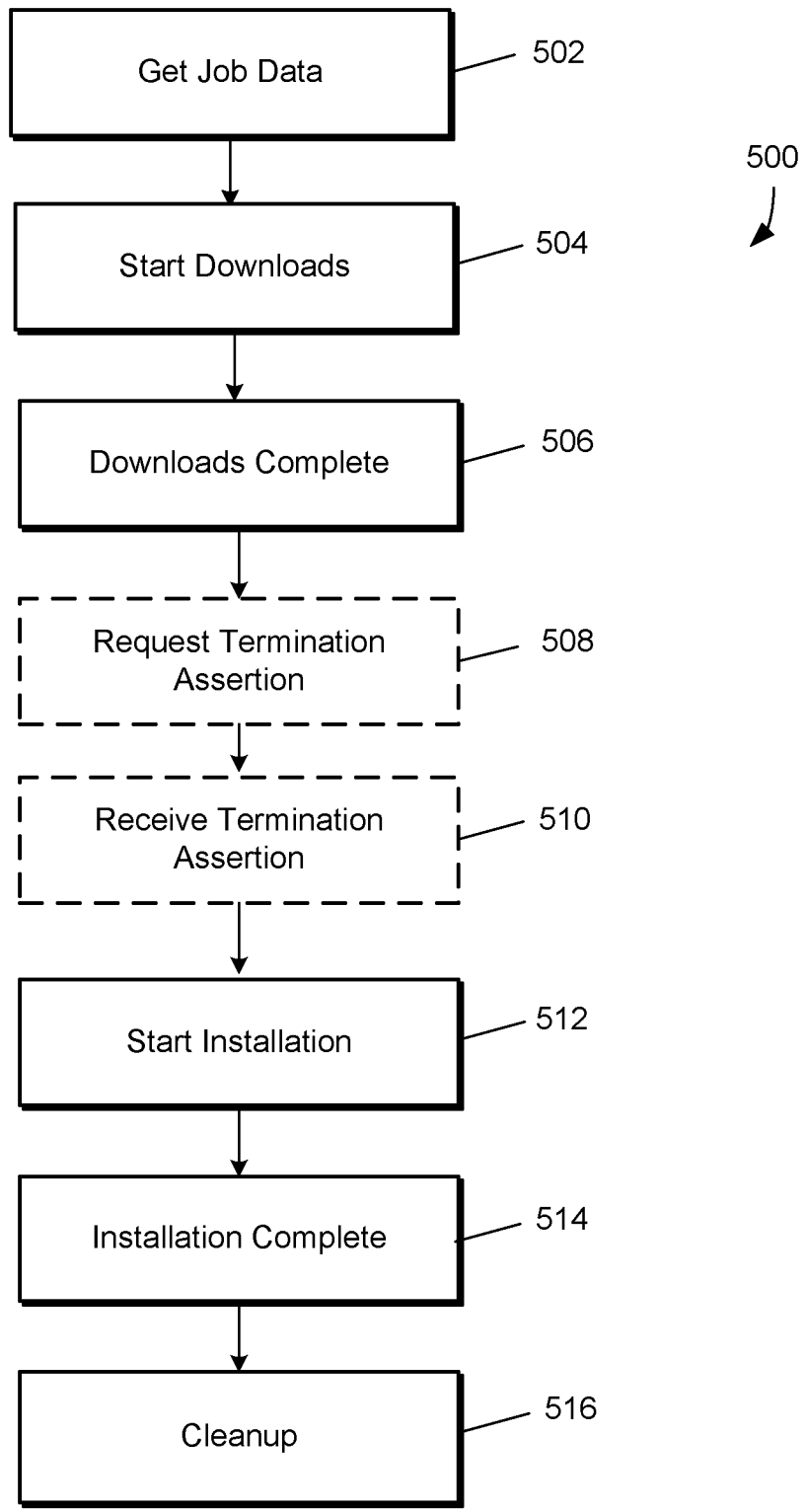
FIG. 5 is a flow diagram of an example job management process.

FIG. 5 is a flow diagram of an example job management process 500. App store daemon 112 may handle a job, such as installing, updating, or restoring an app, using this process 500. Job state machine 120 may transition from one state to another as the process 500 advances.

In step 502, app store daemon 112 may get job data 108 from database 110 as described above. At this step, job state machine 120 may be stored in database 110 in waiting state 202.

In step 504, app store daemon 112 may start the download or downloads for the job (e.g., app installation or update data). This may include transitioning job state machine 120 into downloading state 204 and storing the updated state in database 110.

In step 506, downloads may complete, either because of an error or cancelation or because all requested data has been received. In some embodiments, this may include transitioning job state machine 120 into failed state 210 or installing state, respectively, and storing the updated state in database 110. In other embodiments (e.g., when the job is an app upgrade), this may include transitioning job state machine 120 into pending assertion state 206 and storing the updated state in database 110.

In step 508, when job state machine 120 is in pending assertion state 206, app store daemon 112 may request a termination assertion requesting notification when the app is terminated and instructing device 100 operating system to render the app unlaunchable until the job is complete.

In step 510, app store daemon 112 may receive the requested termination assertion. This may include transitioning job state machine 120 into installing state 208 and storing the updated state in database 110.

In step 512, app store daemon 112 may start installing the app or upgrade. In step 514, app store daemon 112 may finish the installation. In step 516, app store daemon 112 may perform cleanup of install data, which may include removing job state machine 120 and any other state machines related to the job from database 110.

Because job state machine 120 transitions are made and stored in database 110 as process 500 proceeds, process 500 can be restored from the point of the last saved state in case of crash or other premature termination, rather than restarted from the beginning.

Figure 6:
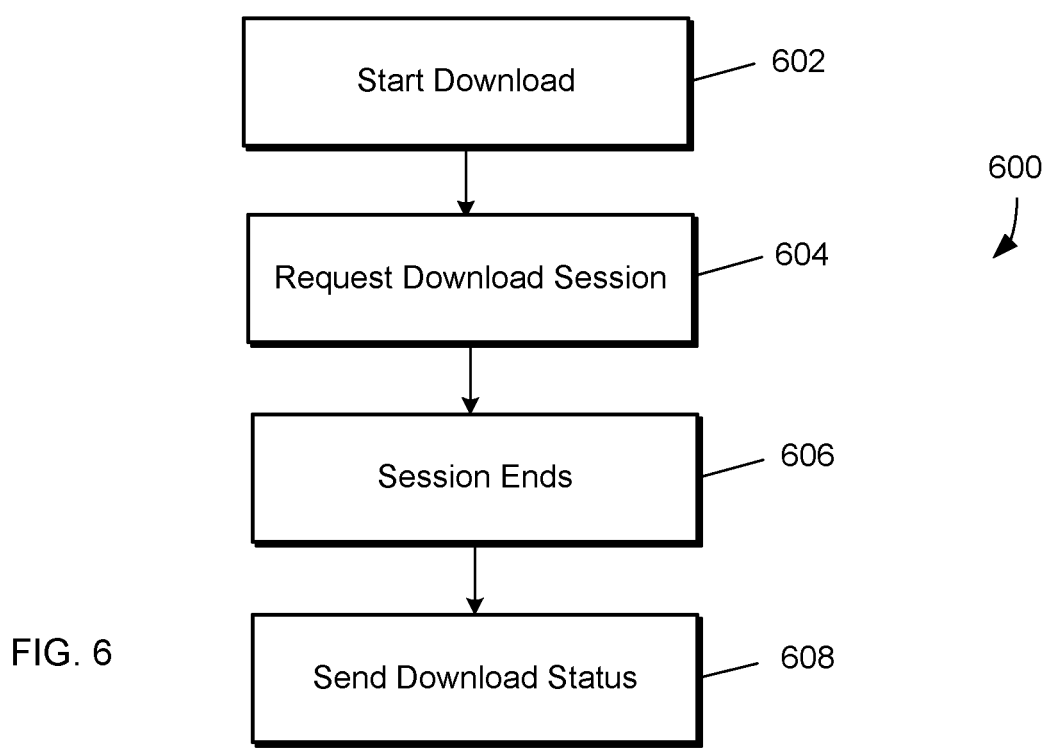
FIG. 6 is a flow diagram of an example download management process.

FIG. 6 is a flow diagram of an example download management process 600. When a job initiates a download (e.g., step 504 of process 500), app store daemon 112 may perform download management process 600. Each resource being downloaded as part of a job may have its own process 600. Download state machine 130 may transition from one state to another as the process 600 advances.

In step 602, app store daemon 112 may start the download. This may include transitioning download state machine 130 from waiting state 302 to downloading state 304 and storing the updated state in database 110.

In step 604, app store daemon 112 may request a download session with a remote storage location from which the app data is to be downloaded. The request may include an NSURL request based on job data 108 from database 110. The download session may begin, and device 100 may receive data from the remote storage location.

In step 606, the download session may end. This may happen when the download fails or is canceled or is completed successfully. In the latter case, app store daemon 112 may transition download state machine 130 from downloading state 304 to pending install state 306 and store the updated state in database 110. Otherwise, app store daemon 112 may transition download state machine 130 from downloading state 304 to failed state 308 and store the updated state in database 110.

In step 608, app store daemon 112 may send download status (e.g., success or failure) to other state machines to allow them to transition. For example, job state machine may transition to installing state 208, pending assertion state 206, or failed state 210, as described above.

Figure 7:
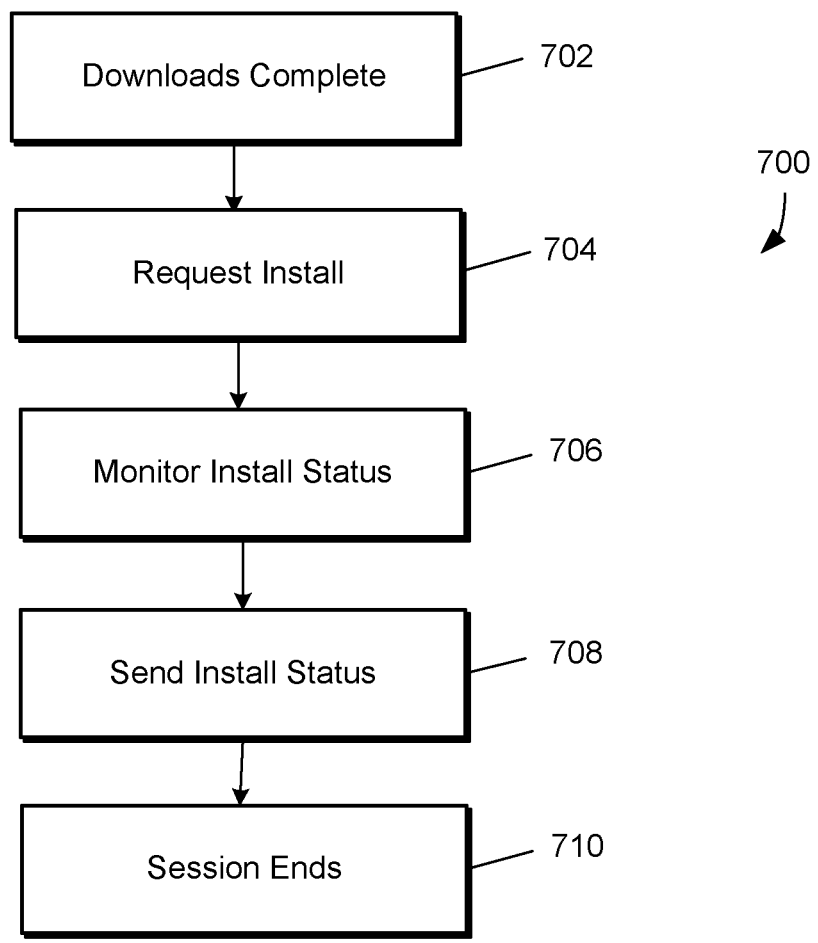
FIG. 7 is a flow diagram of an example install management process.

FIG. 7 is a flow diagram of an example install management process 700. When all downloads for a job are complete (e.g., step 506 of process 500 and step 608 of process 600 after successful download), app store daemon 112 may perform install management process 700. Install state machine 140 may transition from one state to another as the process 700 advances.

In step 702, app store daemon 112 may place a downloads complete event on job pipeline 114. This may cause job state machine 120 to transition from downloading state 204 or pending assertion state 206 to installing state and store the updated state in database 110. This may also cause install state machine 140 to transition from placeholder state 404 to installing state 406.

In step 704, app store daemon 112 may request an installation session, which may include generating or receiving (e.g., from user input) installation settings, locations in device 100 file system for installation, and/or other settings. The installation session may begin, and device 100 may perform application installation using the downloaded data.

Occasionally, for example periodically or in response to user or program request, app store daemon 112 may report install status. In step 706, app store daemon 112 may monitor install status, for example by determining and/or tracking the progress of the installation in terms of percentage complete, time remaining, tasks complete, bytes processed, and/or some other criteria.

In step 708, app store daemon 112 may send install status to another process. For example, app store daemon 112 may send status to a desktop manager or other operating system component to allow that component to display a status bar, percentage complete, and/or other indication of install status.

In step 710, the install session may end. This may happen when the install fails or is canceled or is completed successfully. In the latter case, app store daemon 112 may transition install state machine 140 from installing state 406 to done state 412 and store the updated state in database 110. Otherwise, app store daemon 112 may transition install state machine 140 from installing state 406 to failed state 410 and store the updated state in database 110.

Example Embodiments

Figure 8A:
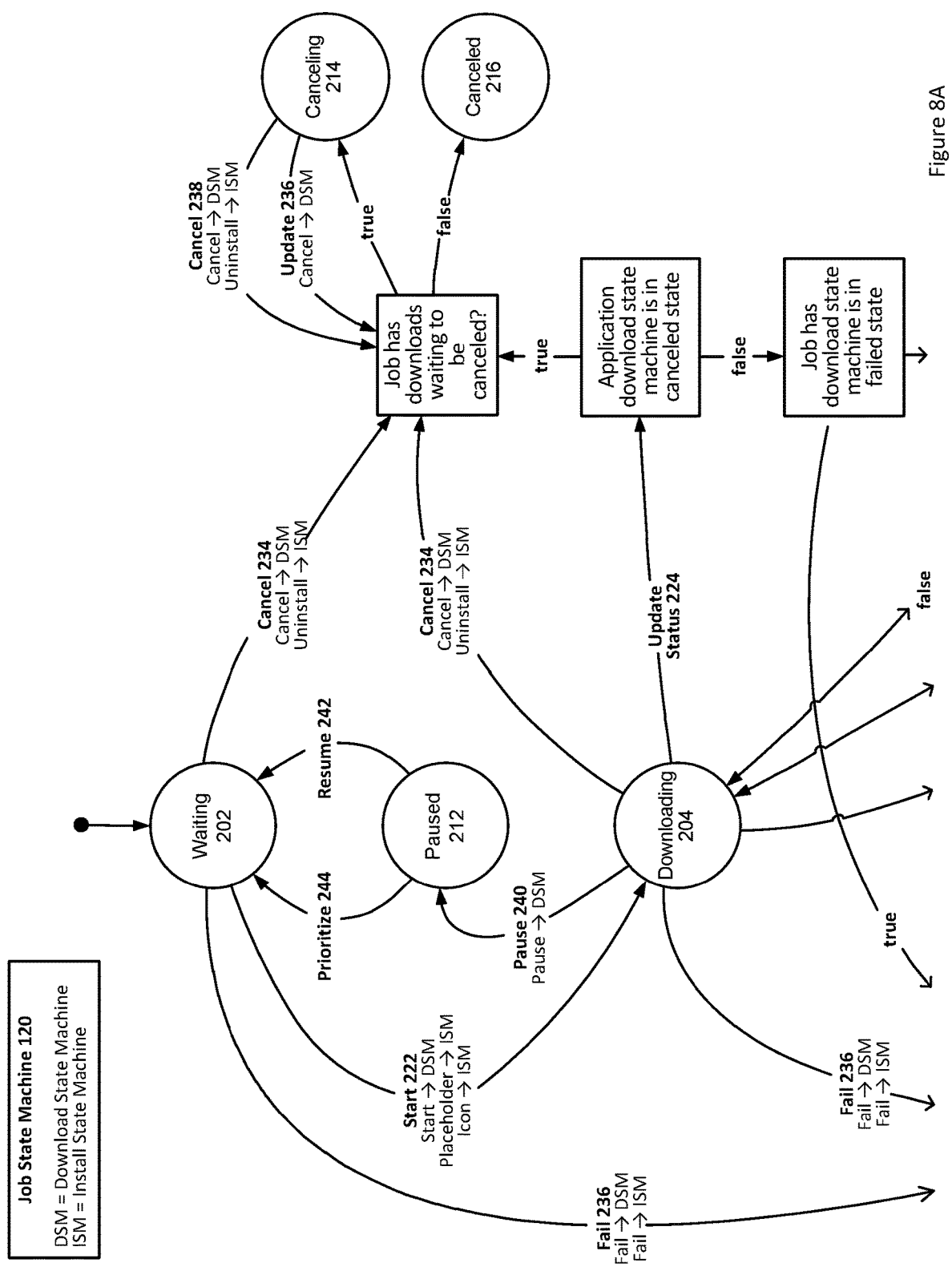
FIGS. 8A-8B are example state diagrams for a job state machine.
Figure 8B:
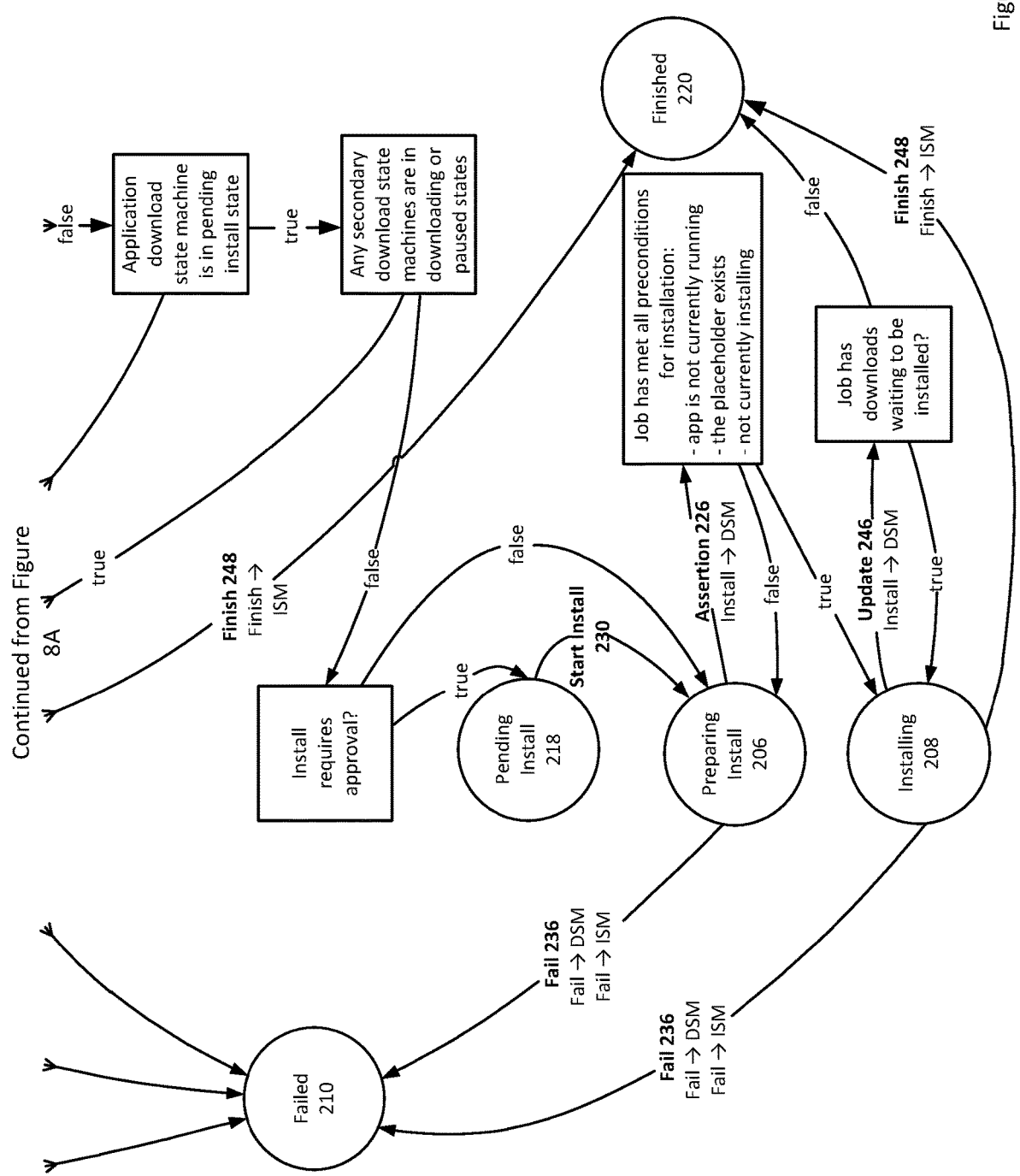

FIGS. 8A-8B together form an example state diagram for an embodiment of job state machine 120. Job state machine 120 may perform as described above. The state diagram shows the states that job state machine 120 may have and a variety of possible transitions that take the job state machine 120 from one state to another, as well as the effects these transitions have on the download state machines 130 and install state machine 140.

As described above, job state machine 120 may be instantiated in waiting state 202. From waiting state 202, job state machine 120 may transition to downloading state 204, failed state 210, canceling state 214, or canceled state 216. The specific transition causing the change from waiting state 202 to another state may depend on the status of the job.

For example, by default, job state machine 120 may transition (start transition 222) from waiting 202 to downloading 204 unless there are problems or cancel commands. This transition may place a start event for download state machines and placeholder and icon events for install state machine on job pipeline 114.

If there is a problem with the job while job state machine 120 is in waiting 202 (e.g., an error, crash, or the like), job state machine 120 may transition (fail transition 236) from waiting 202 to failed 210. This transition may place a fail event for download state machines and a fail event for install state machine on job pipeline 114.

If a cancel command is received while job state machine 120 is in waiting 202 (e.g., from a user input or another device 100 process), job state machine 120 may transition (cancel transition 234) from waiting 202 to canceling 214 or canceled 216, depending on job status. For example, if there are no jobs waiting to be canceled, job state machine 120 may enter canceled state 216. This transition may place a cancel event for download state machines and an uninstall event for install state machine on job pipeline 114.

If the job state machine 120 is in waiting 202 but has downloads waiting to be canceled (e.g., after a paused state 212 as described below), job state machine 120 may enter canceling state 214. If job state machine 120 transitions to canceling 214, app store daemon 112 may place cancel events for pending downloads and/or uninstall events for installed data on pipeline 114 (update transition 236 and/or cancel transition 238). Job may remain in canceling 214 until no more downloads are waiting to be canceled. When there are no more downloads waiting to be canceled, job state machine 120 may enter canceled state 216. This transition may place a cancel event for download state machines and an uninstall event for install state machine on job pipeline 114.

Job state machine 120 may be in downloading state 204 while application data is downloading. From downloading state 204, job state machine 120 may transition to paused state 212, failed state 210, canceling state 214, canceled state 216, finished state 220, or pending install state 218. The specific transition causing the change from downloading state 204 to another state may depend on the status of the job.

While job state machine 120 is in downloading state 204, a user or application may issue a pause command instructing app store daemon 112 to pause downloading. In response, job state machine 120 may transition (pause 240) from downloading state 204 to paused state 212. This transition may place a pause event for download state machines on job pipeline 114. Job state machine 120 may transition (resume 242 or prioritize 244) back to waiting 202 in response to another command. For example, a resume command may cause job state machine 120 to transition back to waiting 202 and then back to downloading 204, in which app store daemon 112 may continue downloading data as before pausing. A prioritize command may cause job state machine 120 to transition back to waiting 202 and then back to downloading 204, in which app store daemon 112 may download data in a different order from before pausing (e.g., prioritize downloading the main portion of the app and cause secondary downloads to wait).

If there is a problem with the job while job state machine 120 is in downloading 204 (e.g., an error, crash, or the like), job state machine 120 may transition (fail transition 236) from downloading 204 to failed 210. This transition may place a fail event for download state machines and a fail event for install state machine on job pipeline 114.

If a cancel command is received while job state machine 120 is in downloading 204 (e.g., from a user input or another device 100 process), job state machine 120 may transition (cancel transition 234) from downloading 204 to canceling 214 or canceled 216, depending on job status. For example, if there are no jobs waiting to be canceled (e.g., after all downloads have completed but before job state machine 120 has transitioned out of downloading 204), job state machine 120 may enter canceled state 216. This transition may place a cancel event for download state machines and an uninstall event for install state machine on job pipeline 114.

If the job state machine 120 is in downloading 204 but has downloads waiting to be canceled (e.g., before all downloads have completed), job state machine 120 may enter canceling state 214. If job state machine 120 transitions to canceling 214, app store daemon 112 may place cancel events for pending downloads and/or uninstall events for installed data on pipeline 114 (update transition 236 and/or cancel transition 238). Job may remain in canceling 214 until no more downloads are waiting to be canceled. When there are no more downloads waiting to be canceled, job state machine 120 may enter canceled state 216. This transition may place a cancel event for download state machines and an uninstall event for install state machine on job pipeline 114.

In some cases, app store daemon 112 may have no further installation processing to perform after job data is downloaded. For example, if an app is being upgraded or modified, and the data being downloaded is content data or other data that does not require unpacking, registering, etc., job state machine 120 may transition (finish 248) from downloading 204 to finished 220. This transition may place a finish event for install state machine on job pipeline 114.

While job state machine 120 is in downloading 204, app store daemon 112 may place update events 246 on the pipeline 114. In response, as described in greater detail below, download state machines 130 may report status.

If a download state machine 130 downloading a required element (e.g., core application data) reports back in canceled state, job state machine 120 may transition from downloading 204 to canceling 214 or canceled 216. If there are downloads waiting to be canceled (e.g., before all downloads have completed), job state machine 120 may enter canceling state 214. If job state machine 120 transitions to canceling 214, app store daemon 112 may place cancel events for pending downloads and/or uninstall events for installed data on pipeline 114 (update transition 236 and/or cancel transition 238). Job may remain in canceling 214 until no more downloads are waiting to be canceled. When there are no more downloads waiting to be canceled, job state machine 120 may enter canceled state 216. This transition may place a cancel event for download state machines and an uninstall event for install state machine on job pipeline 114.

If no download state machine 130 downloading a required element reports back in canceled state, but a download state machine 130 downloading a required element reports back in failed state, job state machine 120 may transition to failed state 210. This transition may place a fail event for download state machines and a fail event for install state machine on job pipeline 114.

If download state machine 130 downloading a required element reports back in pending install state, this may indicate that the download is complete. Download state machine 130 may remain in downloading 304 until secondary download state machines 130, if any exist, are in pending install state. Job state machine 120 may transition to preparing install 206 or, if the install requires approval (e.g., user input), job state machine 120 may transition to pending install 218 until approval is received, at which time job state machine 120 may transition (start install 230) to preparing install 206.

While job state machine 120 is in preparing install 206, app store daemon 112 may request an assertion 226 from device 100 (e.g., operating system, system manager, or the like), which may also place an install event 230 on job pipeline 114. In response, the operating system may verify that job has met all preconditions for installation (e.g., app is not currently running, placeholder (e.g., icon on desktop) exists, app is not currently installing, or other criteria that may prevent or hinder application from installing properly. If the assertion reply is false, app store daemon 112 may wait and request another assertion 226 after some time elapses. If the assertion reply is true, job state machine 120 may transition to installing 208.

While job state machine 120 is in installing 208, app store daemon 112 may be actively installing the application. Additionally, app store daemon 112 may place update events 246 on the pipeline 114. In response, as described in greater detail below, install state machine 140 may report status. This may place an install event for download state machines 130 on job pipeline 114.

If a download state machine 130 has downloads waiting to be installed (e.g., items that have been downloaded and not yet installed and/or pending, nonessential downloads), job state machine 120 may remain in installing 208 until all downloads are installed. When all downloads have been installed, job state machine 120 may transition (finish 248) to finished 220. This may place a finish event for install state machine 140 on job pipeline 114.

Figure 9:
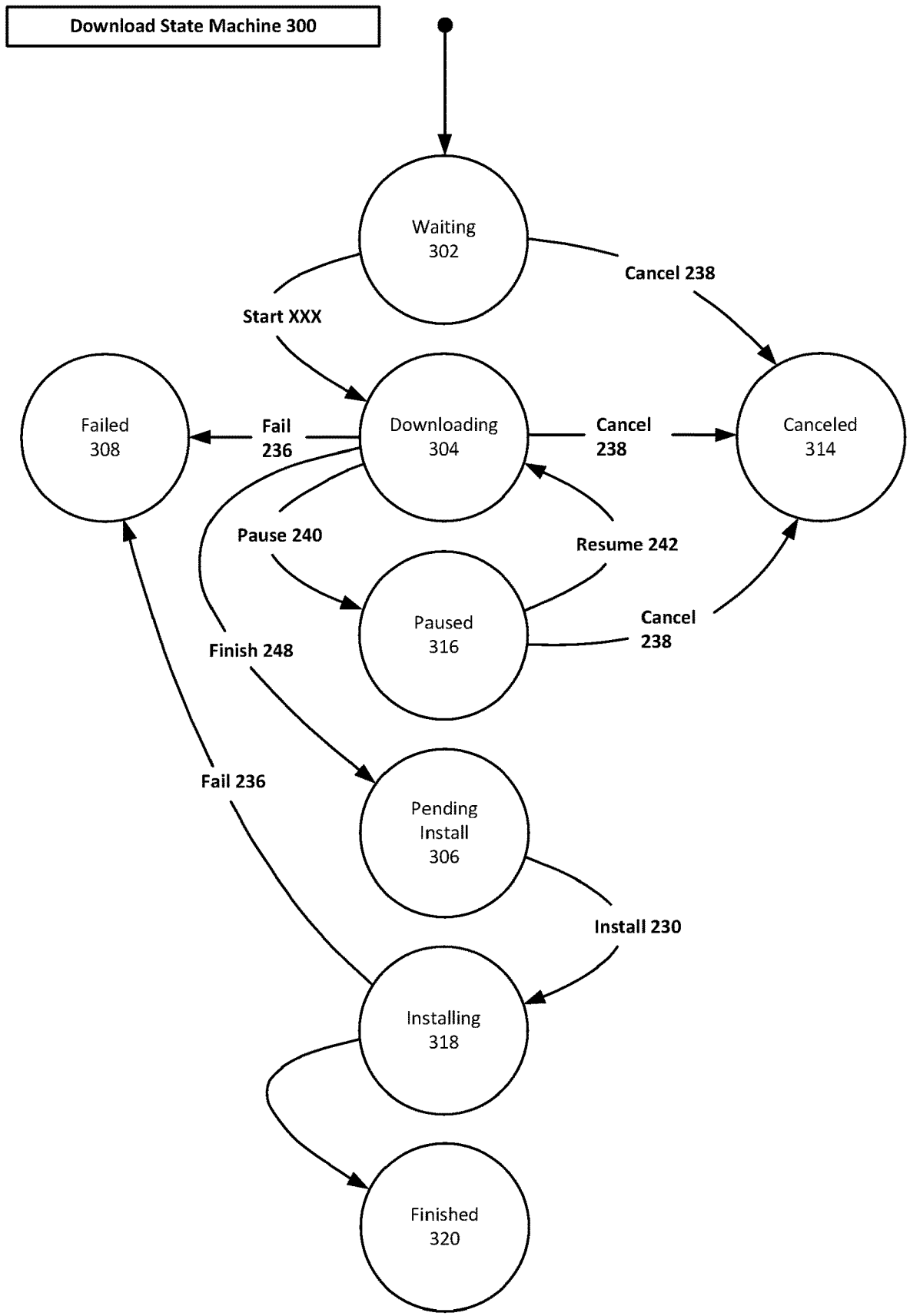
FIG. 9 is an example state diagram for a download state machine.

FIG. 9 is an example state diagram for an embodiment of download state machine 130. Download state machine 130 may perform as described above and may define states for a download object instantiated by the job object whose job state machine 120 is described with respect to FIGS. 8A-8B. The job object may instantiate many download state machines 130 in some embodiments. The download state machine 130 of FIG. 9 is for a single download but may be representative of other download state machines 130. The state diagram shows the states that download state machine 130 may have and a variety of possible transitions that take the download state machine 130 from one state to another, as well as the effects these transitions have on the job state machine 120 and install state machine 140, where applicable.

As described above, download state machine 130 may be instantiated in waiting state 302. From waiting state 302, download state machine 130 may transition to downloading state 304 or canceled state 314. A start event 118 may cause download state machine 130 to transition to downloading 304, and a cancel event 238 may cause download state machine 130 to transition to canceled 314.

Download state machine 130 may be in downloading 304 while download object downloads data from a remote source. From downloading state 304, download state machine 130 may transition to paused state 316, failed state 308, or canceled state 314. A pause event 240 may cause download state machine 130 to transition to paused 316, and a cancel event 238 may cause download state machine 130 to transition to canceled 314. A failure in downloading may trigger download object to place a fail message 236 on job pipeline 114. Job state machine 120 may respond as described above (e.g., fail or continue depending on whether the failed download is critical or not).

While download state machine 130 is in paused 316, download object may pause the download. Download state machine 130 may transition from paused 316 to downloading 304 in response to a resume message 242 appearing on job pipeline 114 or cancel 314 in response to a cancel message 238 appearing on job pipeline 114.

App store daemon 112 may periodically check download status of download object and any other download objects instantiated by the job. When all critical downloads are finished, or all downloads are finished, or all critical downloads are finished and other downloads are either canceled or finished, job object may place a finish message 248 on job pipeline 114, as described above. Download state machine 130 may transition to pending install 306 in response. Download state machine 130 may transition from pending install 306 to installing 406 in response to detecting install message 230 on job pipeline 114, indicating that installing has begun.

While download state machine 130 is in installing 406, download object may be inactive. Download state machine 130 may transition from installing 406 to failed 308 in response to a fail message 236 appearing on job pipeline 114 or finished 320 when the application installation process is finished and the application is installed.

Figure 10:
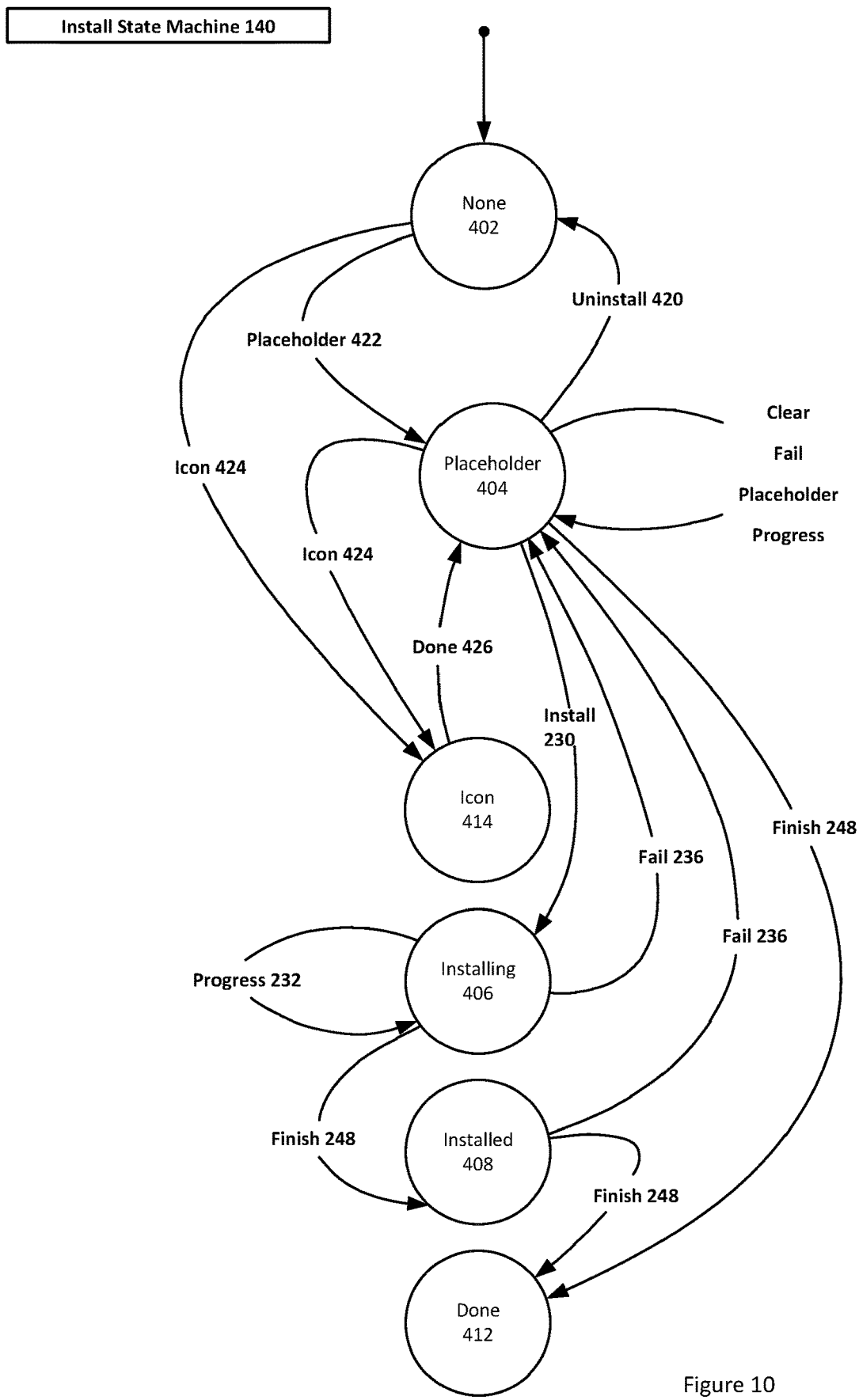
FIG. 10 is an example state diagram for an install state machine.

FIG. 10 is an example state diagram for an embodiment of install state machine 140. Install state machine 140 may perform as described above and may define states for an install object instantiated by the job object whose job state machine 120 is described with respect to FIGS. 8A-8B. The state diagram shows the states that install state machine 140 may have and a variety of possible transitions that take the install state machine 140 from one state to another, as well as the effects these transitions have on the job state machine 120 and download state machines 130, where applicable.

Install objects may not be instantiated upon instantiation of job objects in some embodiments; this is represented by install state machine 140 none state 402 in FIG. 10. As described above, at the start of a job, placeholder and icon objects may appear on job pipeline 114. As illustrated in FIG. 10, install state machine 140 may transition to either icon state 414 or placeholder state 404 first.

If install state machine 140 transitions to icon 414 first, install object may place an icon for the application being installed on a device 100 desktop, start menu, applications list, etc. and, when this is done, install state machine 140 may transition (done 412) to placeholder 404. If install state machine 140 transitions to placeholder 404 first, install state machine 140 may transition (icon 424) to icon 414. Install object may place an icon for the application being installed on a device 100 desktop, start menu, applications list, etc. and, when this is done, install state machine 140 may transition (done 412) to placeholder 404.

While install state machine 140 is in placeholder 404, messages on job pipeline 114 may maintain placeholder state 404 (e.g., clear, fail, placeholder, progress). However, an install 230 message may cause install state machine 140 to transition to installing 406. A cancellation or other terminal message (e.g., finish 248) may cause install state machine 140 to transition to done 412.

While install state machine 140 is in installing 406, install object may perform processing necessary to install the application. App store daemon 112 may periodically check progress 232 of the installation. Install state machine 140 may transition (fail 236) to placeholder 404 in the event of install failure or transition (finish 248) to installed 408 in the event of install success.

While install state machine 140 is in installed 408, install object may perform processing necessary to finalize the installation (e.g., clean up temporary files, notify user of installation success, etc.). Install state machine 140 may transition (fail 236) to placeholder 404 in the event of processing failure or transition (finish 248) to done 412 in the event of install success.

Graphical User Interfaces

This disclosure above describes various GUIs for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Example System Architecture

Figure 11:
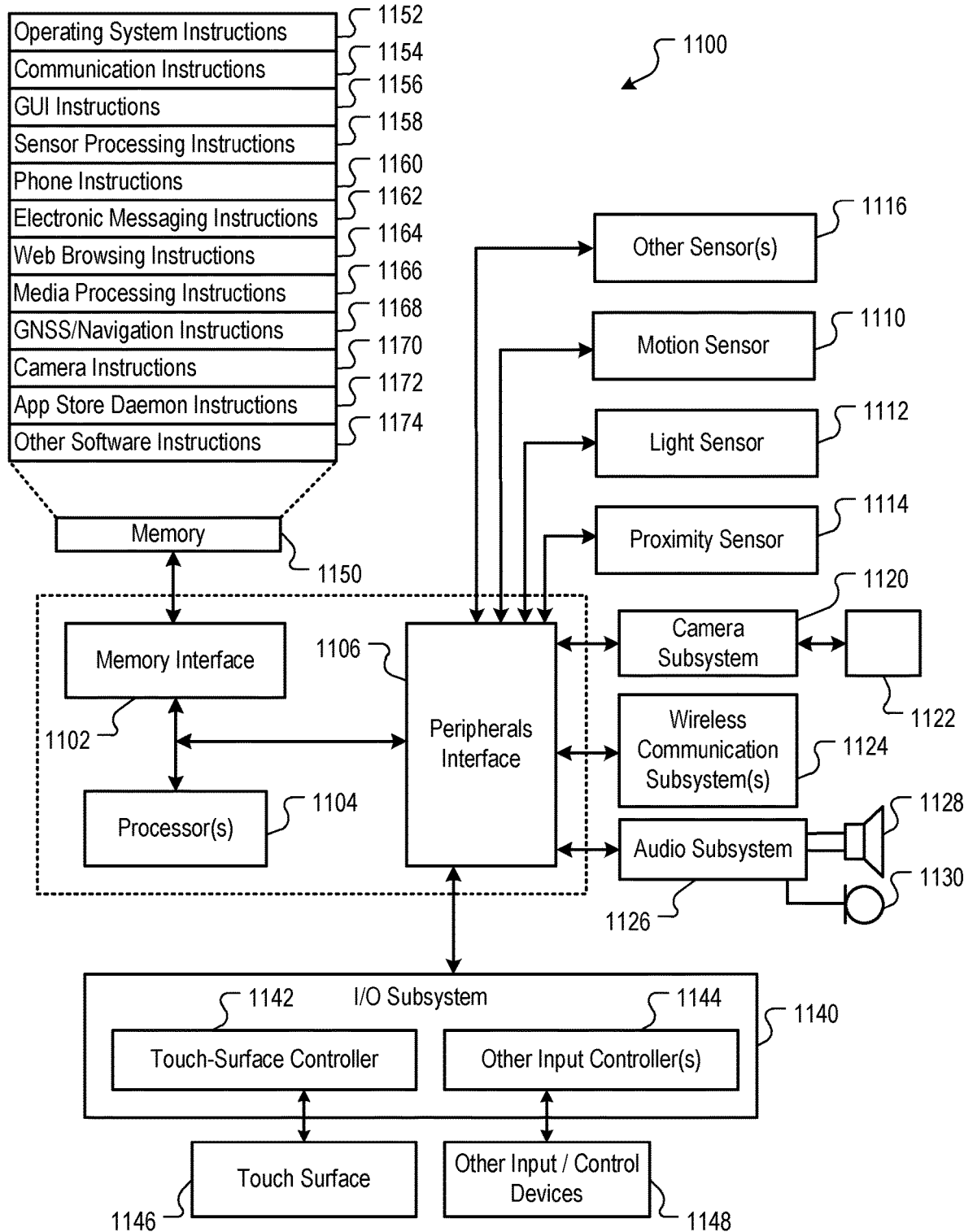
FIG. 11 is a block diagram of an example system architecture implementing the features and processes of FIGS. 1-10.

FIG. 11 is a block diagram of an example computing device 1100 that can implement the features and processes of FIGS. 1-10. The computing device 1100 can include a memory interface 1102, one or more data processors, image processors and/or central processing units 1104, and a peripherals interface 1106. The memory interface 1102, the one or more processors 1104 and/or the peripherals interface 1106 can be separate components or can be integrated in one or more integrated circuits. The various components in the computing device 1100 can be coupled by one or more communication buses or signal lines.

Sensors, devices, and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate orientation, lighting, and proximity functions. Other sensors 1116 can also be connected to the peripherals interface 1106, such as a global navigation satellite system (GNSS) (e.g., GPS receiver), a temperature sensor, a biometric sensor, magnetometer or other sensing device, to facilitate related functionalities.

A camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips. The camera subsystem 1120 and the optical sensor 1122 can be used to collect images of a user to be used during authentication of a user, e.g., by performing facial recognition analysis.

Communication functions can be facilitated through one or more wireless communication subsystems 1124, which can include radio frequency receivers and transmitters and/or optical (e.g., infrared) receivers and transmitters. The specific design and implementation of the communication subsystem 1124 can depend on the communication network(s) over which the computing device 1100 is intended to operate. For example, the computing device 1100 can include communication subsystems 1124 designed to operate over a GSM network, a GPRS network, an EDGE network, a Wi-Fi or WiMax network, and a Bluetooth™ network. In particular, the wireless communication subsystems 1124 can include hosting protocols such that the device 1100 can be configured as a base station for other wireless devices.

An audio subsystem 1126 can be coupled to a speaker 1128 and a microphone 1130 to facilitate voice-enabled functions, such as speaker recognition, voice replication, digital recording, and telephony functions. The audio subsystem 1126 can be configured to facilitate processing voice commands, voiceprinting and voice authentication, for example.

The I/O subsystem 1140 can include a touch-surface controller 1142 and/or other input controller(s) 1144. The touch-surface controller 1142 can be coupled to a touch surface 1146. The touch surface 1146 and touch-surface controller 1142 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1146.

The other input controller(s) 1144 can be coupled to other input/control devices 1148, such as one or more buttons, rocker switches, thumb-wheel, infrared port, USB port, and/or a pointer device such as a stylus. The one or more buttons (not shown) can include an up/down button for volume control of the speaker 1128 and/or the microphone 1130.

In one implementation, a pressing of the button for a first duration can disengage a lock of the touch surface 1146; and a pressing of the button for a second duration that is longer than the first duration can turn power to the computing device 1100 on or off. Pressing the button for a third duration can activate a voice control, or voice command, module that enables the user to speak commands into the microphone 1130 to cause the device to execute the spoken command. The user can customize a functionality of one or more of the buttons. The touch surface 1146 can, for example, also be used to implement virtual or soft buttons and/or a keyboard.

In some implementations, the computing device 1100 can present recorded audio and/or video files, such as MP3, AAC, and MPEG files. In some implementations, the computing device 1100 can include the functionality of an MP3 player, such as an iPod™. The computing device 1100 can, therefore, include a 36-pin connector that is compatible with the iPod. Other input/output and control devices can also be used.

The memory interface 1102 can be coupled to memory 1150. The memory 1150 can include high-speed random access memory and/or non-volatile memory, such as one or more magnetic disk storage devices, one or more optical storage devices, and/or flash memory (e.g., NAND, NOR). The memory 1150 can store an operating system 1152, such as Darwin, RTXC, LINUX, UNIX, OS X, WINDOWS, or an embedded operating system such as VxWorks.

The operating system 1152 can include instructions for handling basic system services and for performing hardware dependent tasks. In some implementations, the operating system 1152 can be a kernel (e.g., UNIX kernel). In some implementations, the operating system 1152 can include instructions for performing voice authentication. For example, operating system 1152 can implement the installation features as described with reference to FIGS. 1-10.

The memory 1150 can also store communication instructions 1154 to facilitate communicating with one or more additional devices, one or more computers and/or one or more servers. The memory 1150 can include graphical user interface instructions 1156 to facilitate graphic user interface processing; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GNSS/Navigation instructions 1168 to facilitate GNSS and navigation-related processes and instructions; and/or camera instructions 1170 to facilitate camera-related processes and functions.

The memory 1150 can store app store daemon instructions 1172 to facilitate other processes and functions, such as the installation processes and functions (e.g., instantiating and transitioning jobs, downloads, and/or installations) as described with reference to FIGS. 1-10.

The memory 1150 can also store other software instructions 1174, such as web video instructions to facilitate web video-related processes and functions; and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1150 can include additional instructions or fewer instructions. Furthermore, various functions of the computing device 1100 can be implemented in hardware and/or in software, including in one or more signal processing and/or application specific integrated circuits.

The described features may be implemented advantageously in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of managing application installation on a device, the method comprising:
   instantiating, with a job manager, a job object comprising a job state machine in a waiting state and a job pipeline configured to relay messages related to a job;
   transitioning, with the job object, the job state machine to a downloading state in response to a start message on the job pipeline, wherein the job object causes job data to be downloaded to the device when the job state machine is in the downloading state;
   transitioning, with the job object, the job state machine to an installing state in response to an assertion message on the job pipeline, wherein the job object causes downloaded job data to be installed on the device when the job state machine is in the installing state; and
   transitioning, with the job object, the job state machine to a finished state when the job data is installed on the device;
   wherein the job state machine is recoverable to the waiting state, the downloading state, or the installing state in response to a job object failure while the job state machine is in the waiting state, downloading state, or installing state, respectively.

2. The method of claim 1, further comprising:
   transitioning, with the job object, the job state machine to a canceling state in response to a cancel message on the job pipeline and a determination that a job data download is pending; and
   transitioning, with the job object, the job state machine to a canceled state in response to a cancel message on the job pipeline and a determination that no job data download is pending.

3. The method of claim 1, further comprising transitioning, with the job object, the job state machine to a failed state in response to the job object failure.

4. The method of claim 1, further comprising:
   transitioning, with the job object, the job state machine to a paused state in response to a pause message on the job pipeline; and
   transitioning, with the job object, the job state machine to the waiting state in response to a resume message on the job pipeline.

5. The method of claim 1, further comprising:
   transitioning, with the job object, the job state machine to a pending install state before the transitioning to the installing state; wherein:
   the job object receives user approval of the job when the job state machine is in the pending install state; and
   the job state machine is recoverable to the pending install state in response to a job object failure while the job state machine is in the pending install state.

6. The method of claim 1, further comprising:
   transitioning, with the job object, the job state machine to a preparing install state before the transitioning to the installing state; wherein:
   the job object receives an assertion that a precondition for installing has been met when the job state machine is in the preparing install state;
   the transitioning to the installing state is performed upon receiving the assertion; and
   the job state machine is recoverable to the preparing install state in response to a job object failure while the job state machine is in the preparing install state.

7. The method of claim 1, further comprising:
   instantiating, with the job manager, a download object comprising a download state machine (DSM) in a waiting state;
   when the job state machine transitions to the downloading state, transitioning, with the download object, the download state machine to a DSM downloading state, wherein the download object downloads the job data to the device when the download state machine is in the DSM downloading state; and
   after a completion of job data downloading, transitioning, with the download object, the download state machine out of the DSM downloading state;
   wherein the download state machine is recoverable to the DSM downloading state in response to a download object failure while the download state machine is in the DSM downloading state.

8. The method of claim 7, wherein the completion of job data downloading by the download object triggers a transition of the job state machine out of the downloading state.

9. The method of claim 7, wherein the completion of job data downloading comprises a completed download, a download failure, or a download cancellation.

10. The method of claim 1, further comprising:
instantiating, with the job manager, an install object comprising an install state machine (ISM);
when the job state machine transitions to the installing state, transitioning, with the install object, the install state machine to an ISM installing state, wherein the install object installs the job data to the device when the install state machine is in the ISM installing state; and
after a completion of job data installation, transitioning, with the install object, the install state machine out of the ISM installing state;
wherein the install state machine is recoverable to the ISM installing state in response to an install object failure while the install state machine is in the ISM installing state.

11. The method of claim 10, wherein the completion of job data installation by the install object triggers a transition of the job state machine out of the installing state.

12. The method of claim 10, further comprising:
instantiating, with the job manager, the install state machine in an icon state or transitioning, with the install object, the install state machine to the icon state, wherein the install object performs processing associated with displaying an icon on the device when the install state machine is in the icon state; and
transitioning, with the install object, the install state machine to a placeholder state when the icon is displayed on the device.

13. The method of claim 1, wherein the job comprises an application installation, an application upgrade, or an application restoration.

14. A non-transitory computer-readable medium comprising code that, when executed by a processor of a device, causes the processor to:
instantiate, with a job manager, a job object comprising a job state machine in a waiting state and a job pipeline configured to relay messages related to a job;
transition, with the job object, the job state machine to a downloading state in response to a start message on the job pipeline, wherein the job object causes job data to be downloaded to the device when the job state machine is in the downloading state;
transition, with the job object, the job state machine to an installing state in response to an assertion message on the job pipeline, wherein the job object causes downloaded job data to be installed on the device when the job state machine is in the installing state; and
transition, with the job object, the job state machine to a finished state when the job data is installed on the device;
wherein the job state machine is recoverable to the waiting state, the downloading state, or the installing state in response to a job object failure while the job state machine is in the waiting state, downloading state, or installing state, respectively.

15. The non-transitory computer-readable medium of claim 14, further comprising code that, when executed by the processor, causes the processor to:
transition, with the job object, the job state machine to a canceling state in response to a cancel message on the job pipeline and a determination that a job data download is pending; and
transition, with the job object, the job state machine to a canceled state in response to a cancel message on the job pipeline and a determination that no job data download is pending.

16. The non-transitory computer-readable medium of claim 14, further comprising code that, when executed by the processor, causes the processor to transition, with the job object, the job state machine to a failed state in response to the job object failure.

17. The non-transitory computer-readable medium of claim 14, further comprising code that, when executed by the processor, causes the processor to:
transition, with the job object, the job state machine to a paused state in response to a pause message on the job pipeline; and
transition, with the job object, the job state machine to the waiting state in response to a resume message on the job pipeline.

18. The non-transitory computer-readable medium of claim 14, further comprising code that, when executed by the processor, causes the processor to:
transition, with the job object, the job state machine to a pending install state before the transitioning to the installing state; wherein:
the job object receives user approval of the job when the job state machine is in the pending install state; and
the job state machine is recoverable to the pending install state in response to a job object failure while the job state machine is in the pending install state.

19. The non-transitory computer-readable medium of claim 14, further comprising code that, when executed by the processor, causes the processor to:
transition, with the job object, the job state machine to a preparing install state before the transitioning to the installing state; wherein:
the job object receives an assertion that a precondition for installing has been met when the job state machine is in the preparing install state;
the transitioning to the installing state is performed upon receiving the assertion; and
the job state machine is recoverable to the preparing install state in response to a job object failure while the job state machine is in the preparing install state.

20. The non-transitory computer-readable medium of claim 14, further comprising code that, when executed by the processor, causes the processor to:
instantiate, with the job manager, a download object comprising a download state machine (DSM) in a waiting state;
when the job state machine transitions to the downloading state, transition, with the download object, the download state machine to a DSM downloading state, wherein the download object downloads the job data to the device when the download state machine is in the DSM downloading state; and
after a completion of job data downloading, transition, with the download object, the download state machine out of the DSM downloading state;
wherein the download state machine is recoverable to the DSM downloading state in response to a download object failure while the download state machine is in the DSM downloading state.

21. The non-transitory computer-readable medium of claim 20, wherein the completion of job data downloading by the download object triggers a transition of the job state machine out of the downloading state.

22. The non-transitory computer-readable medium of claim 20, wherein the completion of job data downloading comprises a completed download, a download failure, or a download cancellation.

23. The non-transitory computer-readable medium of claim 14, further comprising code that, when executed by the processor, causes the processor to:
  instantiate, with the job manager, an install object comprising an install state machine (ISM);
  when the job state machine transitions to the installing state, transition, with the install object, the install state machine to an ISM installing state, wherein the install object installs the job data to the device when the install state machine is in the ISM installing state; and
  after a completion of job data installation, transition, with the install object, the install state machine out of the ISM installing state;
  wherein the install state machine is recoverable to the ISM installing state in response to an install object failure while the install state machine is in the ISM installing state.

24. The non-transitory computer-readable medium of claim 23, wherein the completion of job data installation by the install object triggers a transition of the job state machine out of the installing state.

25. The non-transitory computer-readable medium of claim 23, further comprising code that, when executed by the processor, causes the processor to:
  instantiate, with the job manager, the install state machine in an icon state or transition, with the install object, the install state machine to the icon state, wherein the install object performs processing associated with displaying an icon on the device when the install state machine is in the icon state; and
  transition, with the install object, the install state machine to a placeholder state when the icon is displayed on the device.

26. The non-transitory computer-readable medium of claim 14, wherein the job comprises an application installation, an application upgrade, or an application restoration.

27. A method of managing application installation on a device, the method comprising:
  instantiating, with a job manager, a job object comprising a job state machine in a waiting state and a job pipeline configured to relay messages related to the job;
  downloading, with the job object, job data in response to a start message on the job pipeline, wherein the job state machine is in a downloading state during the downloading;
  installing, with the job object, downloaded job data on the device, wherein the job state machine is in an installing state during the installing; and
  completing, with the job object, the job, wherein the job state machine is in a finished state during the completing;
  wherein the job is recoverable to the instantiating step, the downloading step, or the installing step in response to a job object failure by restoring the job state machine to the waiting state, downloading state, or installing state, respectively.

28. The method of claim 27, further comprising:
  canceling, with the job object, the job in response to a cancel message on the job pipeline and a determination that a job data download is pending, wherein the job state machine is in a canceling state during the canceling; and
  ending, with the job object, the job in response to a cancel message on the job pipeline and a determination that no job data download is pending, wherein the job state machine is in a canceled state during the ending.

29. The method of claim 27, wherein the job state machine is in a failed state after the job object failure.

30. The method of claim 27, further comprising:
  pausing, with the job object, the job in response to a pause message on the job pipeline, wherein the job state machine is in a paused state during the pausing; and
  resuming, with the job object, the job in response to a resume message on the job pipeline, wherein the job state machine is returned to the waiting state upon resuming.

31. The method of claim 27, further comprising:
  requesting, with the job object, user approval of the job before the installing; wherein:
    the job state machine is in a pending install state during the requesting; and
    the job is recoverable to the requesting step in response to a job object failure by restoring the job state machine to the pending install state.

32. The method of claim 27, further comprising:
  preparing, with the job object, an installation before the installing state; wherein:
    the job state machine is in a preparing install state during the preparing;
    the job object receives an assertion that a precondition for installing has been met when the job state machine is in the preparing install state;
    the installing is performed upon receiving the assertion; and
    the job is recoverable to the preparing install state in response to a job object failure by restoring the job state machine to the preparing install state.

33. The method of claim 27, further comprising:
  instantiating, with the job manager, a download object comprising a download state machine (DSM) in a waiting state;
  when the job state machine transitions to the downloading state, transitioning, with the download object, the download state machine to a DSM downloading state, wherein the download object downloads the job data to the device when the download state machine is in the DSM downloading state; and
  after a completion of job data downloading, transitioning, with the download object, the download state machine out of the DSM downloading state;
  wherein the download state machine is recoverable to the DSM downloading state in response to a download object failure while the download state machine is in the DSM downloading state.

34. The method of claim 33, wherein the completion of job data downloading by the download object triggers a transition of the job state machine out of the downloading state.

35. The method of claim 33, wherein the completion of job data downloading comprises a completed download, a download failure, or a download cancellation.

36. The method of claim 27, further comprising:
  instantiating, with the job manager, an install object comprising an install state machine (ISM);
  when the job state machine transitions to the installing state, transitioning, with the install object, the install state machine to an ISM installing state, wherein the install object installs the job data to the device when the install state machine is in the ISM installing state; and
  after a completion of job data installation, transitioning, with the install object, the install state machine out of the ISM installing state;

wherein the install state machine is recoverable to the ISM installing state in response to an install object failure while the install state machine is in the ISM installing state.

37. The method of claim 36, wherein the completion of job data installation by the install object triggers a transition of the job state machine out of the installing state.

38. The method of claim 36, further comprising:
instantiating, with the job manager, the install state machine in an icon state or transitioning, with the install object, the install state machine to the icon state, wherein the install object performs processing associated with displaying an icon on the device when the install state machine is in the icon state; and
transitioning, with the install object, the install state machine to a placeholder state when the icon is displayed on the device.

39. The method of claim 27, wherein the job comprises an application installation, an application upgrade, or an application restoration.

40. A non-transitory computer-readable medium comprising code that, when executed by a processor of a device, causes the processor to:
instantiate, with a job manager, a job object comprising a job state machine in a waiting state and a job pipeline configured to relay messages related to the job;
download, with the job object, job data in response to a start message on the job pipeline, wherein the job state machine is in a downloading state during the downloading;
install, with the job object, downloaded job data on the device, wherein the job state machine is in an installing state during the installing; and
complete, with the job object, the job, wherein the job state machine is in a finished state during the completing;
wherein the job is recoverable to the instantiating step, the downloading step, or the installing step in response to a job object failure by restoring the job state machine to the waiting state, downloading state, or installing state, respectively.

41. The non-transitory computer-readable medium of claim 40, further comprising code that, when executed by the processor, causes the processor to:
cancel, with the job object, the job in response to a cancel message on the job pipeline and a determination that a job data download is pending, wherein the job state machine is in a canceling state during the canceling; and
end, with the job object, the job in response to a cancel message on the job pipeline and a determination that no job data download is pending, wherein the job state machine is in a canceled state during the ending.

42. The non-transitory computer-readable medium of claim 40, wherein the job state machine is in a failed state after the job object failure.

43. The non-transitory computer-readable medium of claim 40, further comprising code that, when executed by the processor, causes the processor to:
pause, with the job object, the job in response to a pause message on the job pipeline, wherein the job state machine is in a paused state during the pausing; and
resume, with the job object, the job in response to a resume message on the job pipeline, wherein the job state machine is returned to the waiting state upon resuming.

44. The non-transitory computer-readable medium of claim 40, further comprising code that, when executed by the processor, causes the processor to:
request, with the job object, user approval of the job before the installing; wherein:
the job state machine is in a pending install state during the requesting; and
the job is recoverable to the requesting step in response to a job object failure by restoring the job state machine to the pending install state.

45. The non-transitory computer-readable medium of claim 40, further comprising code that, when executed by the processor, causes the processor to:
prepare, with the job object, an installation before the installing state; wherein:
the job state machine is in a preparing install state during the preparing;
the job object receives an assertion that a precondition for installing has been met when the job state machine is in the preparing install state;
the installing is performed upon receiving the assertion; and
the job is recoverable to the preparing install state in response to a job object failure by restoring the job state machine to the preparing install state.

46. The non-transitory computer-readable medium of claim 40, further comprising code that, when executed by the processor, causes the processor to:
instantiate, with the job manager, a download object comprising a download state machine (DSM) in a waiting state;
when the job state machine transitions to the downloading state, transition, with the download object, the download state machine to a DSM downloading state, wherein the download object downloads the job data to the device when the download state machine is in the DSM downloading state; and
after a completion of job data downloading, transition, with the download object, the download state machine out of the DSM downloading state;
wherein the download state machine is recoverable to the DSM downloading state in response to a download object failure while the download state machine is in the DSM downloading state.

47. The non-transitory computer-readable medium of claim 46, wherein the completion of job data downloading by the download object triggers a transition of the job state machine out of the downloading state.

48. The non-transitory computer-readable medium of claim 46, wherein the completion of job data downloading comprises a completed download, a download failure, or a download cancellation.

49. The non-transitory computer-readable medium of claim 40, further comprising code that, when executed by the processor, causes the processor to:
instantiate, with the job manager, an install object comprising an install state machine (ISM);
when the job state machine transitions to the installing state, transition, with the install object, the install state machine to an ISM installing state, wherein the install object installs the job data to the device when the install state machine is in the ISM installing state; and
after a completion of job data installation, transition, with the install object, the install state machine out of the ISM installing state;

wherein the install state machine is recoverable to the ISM installing state in response to an install object failure while the install state machine is in the ISM installing state.

50. The non-transitory computer-readable medium of claim 49, wherein the completion of job data installation by the install object triggers a transition of the job state machine out of the installing state.

51. The non-transitory computer-readable medium of claim 49, further comprising code that, when executed by the processor, causes the processor to:
  instantiate, with the job manager, the install state machine in an icon state or transition, with the install object, the install state machine to the icon state, wherein the install object performs processing associated with displaying an icon on the device when the install state machine is in the icon state; and
  transition, with the install object, the install state machine to a placeholder state when the icon is displayed on the device.

52. The non-transitory computer-readable medium of claim 40, wherein the job comprises an application installation, an application upgrade, or an application restoration.

* * * * *